(12) United States Patent
Youn et al.

(10) Patent No.: US 8,296,454 B2
(45) Date of Patent: Oct. 23, 2012

(54) PREDICTION-BASED DYNAMIC THREAD POOL MANAGEMENT METHOD AND AGENT PLATFORM USING THE SAME

(75) Inventors: Hee Yong Youn, Seongnam-si (KR); Ji Hoon Kim, Seoul (KR)

(73) Assignee: Sungkyunkwan University, Suwon-Si (KR)

( * ) Notice: Subject to any disclaimer, the term of this patent is extended or adjusted under 35 U.S.C. 154(b) by 1303 days.

(21) Appl. No.: 12/022,889

(22) Filed: Jan. 30, 2008

(65) Prior Publication Data

US 2008/0313637 A1 Dec. 18, 2008

(30) Foreign Application Priority Data

Jun. 13, 2007 (KR) .................. 10-2007-0057707

(51) Int. Cl.
*G06F 15/16* (2006.01)
*G06F 9/46* (2006.01)
(52) U.S. Cl. ..................... 709/232; 718/102
(58) Field of Classification Search .................. None
See application file for complete search history.

(56) References Cited

U.S. PATENT DOCUMENTS

| | | | | |
|---|---|---|---|---|
| 7,207,043 | B2 * | 4/2007 | Blythe et al. ............... | 718/104 |
| 7,237,242 | B2 * | 6/2007 | Blythe et al. ............... | 718/105 |
| 2003/0056123 | A1 * | 3/2003 | Hsieh .......................... | 713/300 |
| 2003/0196136 | A1 * | 10/2003 | Haynes et al. ............... | 714/13 |
| 2007/0197877 | A1 * | 8/2007 | Decorte et al. ............... | 600/300 |
| 2007/0254732 | A1 * | 11/2007 | Walker et al. ............... | 463/16 |
| 2008/0295107 | A1 * | 11/2008 | Muscarella .................. | 718/104 |

FOREIGN PATENT DOCUMENTS

| | | |
|---|---|---|
| KR | 1020040062410 | 7/2004 |
| KR | 1020070059837 | 6/2007 |

* cited by examiner

*Primary Examiner* — Peling Shaw
*Assistant Examiner* — Thomas Richardson
(74) *Attorney, Agent, or Firm* — Lexyoume IP Meister, PLLC

(57) ABSTRACT

The present invention relates to a prediction-based dynamic thread pool management method and an agent platform using the same. An prediction-based dynamic thread pool management method according to the present invention includes: (a) calculating a thread variation to a variation of the number of threads at a time t1, (b) calculating the number of expected threads expected at a time t2 on the basis of the thread variation, (c) determining a change of the thread variation according to the time elapsed, and (d) decreasing an executing frequency of said steps (a) and (b) when it is determined that the change of the thread variation at said step (c) is small and increasing the executing frequency of said steps (a) and (b) when it is determined that the change of the thread variation is large.

8 Claims, 8 Drawing Sheets

PREDICTION-BASED DYNAMIC THREAD POOL MANAGEMENT METHOD AND AGENT PLATFORM USING THE SAME

CLAIMING FOREIGN PRIORITY

The applicant claims and requests a foreign priority, through the Paris Convention for the Protection of Industrial Property, based on patent applications filed in the Republic of Korea (South Korea) with the filing date of Jun. 13, 2007 with the patent application number 10-2007-0057707 by the applicant, the contents of which are incorporated by reference into this disclosure as if fully set forth herein.

BACKGROUND OF THE INVENTION

1. Field of the Invention

The present invention relates to a prediction-based dynamic thread pool management method and an agent platform using the same; and, more particularly, a prediction-based dynamic thread pool management method capable of preventing a delay of response time by generating a thread with previously predicting the number of required threads and performing quick management by suppressing unnecessary waste of resources by increasing the efficiency of resource utilizations and an agent platform using the same.

2. Background of the Related Art

Recently, real-time system technologies such as wireless communications, mobile computing and intelligent agents have realized new paradigms of applications for accessing information anytime and anywhere. The applications for an ubiquitous system need not only to utilize resources distributed and environment but also to provide intelligent services to users.

In order to satisfy these requirements, the applications should require a high degree of flexibility and adaptability in order to deal with dynamic ubiquitous environments and heterogeneous platforms. Also, the applications should be realized by the use of the intelligent agents which provide customized services to each user.

Moreover, the platform itself should be able to provide an optimized service of platform level. Generally, in order to realize this, an agent platform has used a multi-thread model to support a concurrency to simultaneously provide the services to the agents.

Briefly to describe the agent platform, firsts the agent denotes software which automatically carries out a job which the user desires on behalf of the user in a user's view. The character of agent can be autonomy, intelligence, mobility, social ability or the like.

In addition to the basic characteristics of the agent, the agent has reactivity to respond against a change in an environment, veracity to prevent exchange of wrong information and rationality to achieve an object by the use of a rational method.

The agent is largely classified into a multi-agent and a mobile-agent. The multi-agent has a structure in which complicated and various operations, which cannot be solved by only one agent, can be carried out through collaboration between agents and the mobile-agent has a structure in which a program itself moves through a network so as to process tasks depending on a user's object.

The agent platform should support agent communication languages such as ACL (Agent Communication Language) and KQML (Knowledge Query Manipulation Language) so that the agents existing on heterogeneous systems collaborate with each other. Currently, agent platforms such as JADE and Aglets have been widely used.

Herein, FIPA (Foundation for Intelligent Physical Agents) agent management specifications identify roles of key agents required for managing the platform, and describe agent management languages and ontology.

Meanwhile, thread management models such as creation and deletion of a thread have been proposed in various forms under an environment of a computing system such as an agent system.

A thread per request model creates a new thread at a user's request and deletes the created thread after processing the corresponding request. Since the thread per request model has a simple structure and is easily realized, the thread per request model is recognized as a model suitable for database searching or file transferring in which it takes a relatively long time to process one request.

However, the thread per request model creates the new thread and processes the thread when the user's request exists, and deletes the corresponding thread when the processing of the corresponding request is completed. At this time, since the thread per request model may be overloaded by the creation and deletion of the threads, the thread per request model is judged as an inefficient structure in case that it receives many requests from the users.

A worker thread pool model was proposed as an alternative to the thread per request model. The worker thread pool model previously creates a predetermined number of worker threads to form a thread pool. The worker thread pool model allocates one worker thread in the thread pool at the user's request and makes the worker thread be on standby in the thread pool when the processing is terminated.

Therefore, the worker thread pool models have advantages to shorten a response time and eliminate a danger of exhaustion of system resources caused by excessive creation of the thread by removing the overload occurring the creation and deletion of the worker thread.

However, since the predetermined number of worker threads should be maintained in spite of receipt of small number of user's requests, a predetermined amount of system resources is allocated in the worker thread pool model. Even though system resources to which the thread pool is allocated remain, the user's request should be on standby until the worker thread completes the previous operation in case of receipt of larger number of user's requests. As described above, the worker thread pool model has a defect that the system resource cannot be efficiently utilized.

A watermark thread pool model has been developed to efficiently utilize the system resource while maintaining a response time to the user's request short by dynamically changing the size of thread pool according to the user's request amount.

Low and high watermarks are set in the worker thread pool and the worker thread as high as the low watermark is previously created at the time of starting a service. When all threads as high as the low watermark are used due to the large number of user's requests, the worker threads which will process the user's request are created before the high watermark.

However, the watermark thread pool model cannot provide an optimized solution from the viewpoint of the response time or efficient usage of the system resource accompanied by creation of the threads in that it changes the size of the thread pool in case of receipt of the user's request.

SUMMARY OF THE INVENTION

Technical Problem

It is therefore an object of the present invention to provide a prediction-based dynamic pool management method capable of preventing a delay of response time by generating a thread with previously predicting the number of required threads and performing quick management by suppressing unnecessary waste of resources by increasing the efficiency of resource utilizations and an agent platform using the same.

Technical Solution

In order to achieve the above-mentioned object, a prediction-based dynamic thread pool management method according to the present invention includes: (a) calculating a thread variation to a variation of the number of threads at a time t1; (b) calculating the number of expected threads expected at a time t2 on the basis of the thread variation; (c) determining a change of the thread variation according to the time elapsed; and (d) decreasing an expecting frequency of said steps (a) and (b) when it is determined that the change of the thread variation at said step (c) is small and increasing the expecting frequency of said steps (a) and (b) when it is determined that the change of the thread variation is large.

Herein, the step (c) may include: (c1) setting a sampling constant defining the number of the thread variations sampled per hour; (c2) sampling the thread variations per hour as many as the sampling constant; (c3) calculating an average and a variance of the sampled thread variations; (c4) applying the sampled thread variations, the average of the sampled thread variations and the variance of the sampled thread variations to a Gaussian probability density function; and (c5) determining that the change of the thread variation is small in case that the change of the thread variation is out of a predetermined reference range from a center of a result of the application of the Gaussian probability density function and determining that the change of the thread variation is large in case that the change of the thread variation is within the reference range from the center of the result of the application of the Gaussian probability density function.

Herein, the Gaussian probability density function is represented by $$f(x) = \frac{e^{-(x-m)^2/2\sigma^2}}{\sqrt{2\pi\sigma^2}}$$

(where, x represents the thread variation, m represents the average of the thread variations and $\sigma^2$ represents the density of the thread variations.)

And, the step (d) includes: (d1) increasing the executing frequency of said steps (a) and (b) by a predetermined reference unit in case that it is determined that the change of the thread variation is out of the reference range from the center of the result of the application of the Gaussian probability density function in the step (c5); and (d2) decreasing the executing frequency of said steps (a) and (b) by the predetermined reference unit in case that it is determined that the change of the thread variation is within the reference range from the center of the result of the application of the Gaussian probability density function in the step (c5).

And, the center of the application result of the Gaussian probability density function is determined by a Q-Function.

Herein, the steps (d1) and (d2) are represented by $$\begin{cases} \text{if } \forall a_t, 2Q\left[\frac{a_t - m}{\sigma}\right] \geq R \text{ then } \Delta t_d = \Delta t_d - \Delta t_m \\ \text{if } \forall a_t, 2Q\left[\frac{a_t - m}{\sigma}\right] < R \text{ then } \Delta t_d = \Delta t_d + \Delta t_m \end{cases}$$

(where, $a_t$ represents the thread variation, Q(x) represents the Q-Function, R represents the reference range, $\Delta t_m$ represents a time taken to create one thread, and $\Delta t_d$ represents a value corresponding to one cycle in the executing frequency of the steps (a) and (b) and is integral multiple of $\Delta t_m$).

On the other hand, in order to achieve the above-mentioned object, an agent platform in accordance with another embodiment of the present invention includes: a message transport protocol transmitting and receiving messages to and from agents on the basis of HTTP by using an agent communication language to enable cooperation between agents existing in heterogeneous systems; and an agent platform core managing the agents by transmitting and receiving the messages to and from the agents via the message transport protocol by the use of a thread pool managed by a prediction-based dynamic thread pool management method.

Herein, the agent communication language includes an ACL (Agent Communication Language).

And also, the agent platform core includes: a main container being in charge of execution and management of a platform; an agent container managing the agents by hierarchically grouping the agents with a container; and an agent description table managing a reference value for information on the agents by using IDs of the agents as key values.

Herein, the agent container includes: a life-cycle manager monitoring the conditions and operations of the agents; an agent descriptor managing agent specification information including the IDs, addresses and functions of the agents; and a thread pool controller managing the thread pool through the prediction-based dynamic thread pool management method.

And, the message transport protocol includes an HTTP communication including an HTTP server module processing messages received from the agents on the basis of HTTP and an HTTP client module processing the messages transmitted to the agents on the basis of the HTTP; an ACL parser encoding and decoding an ACL message for transmitting and receiving data to and from the agents; and a message queue performing ordering and queuing of the messages transmitted to and received from the agents through the HTTP communication.

Effect of the Invention

As described above, according to the present invention, there are provided a prediction-based dynamic pool management method capable of preventing a delay of response time by generating a thread with previously predicting the number of required threads and performing quick management by suppressing unnecessary waste of resources by increasing the efficiency of resource utilizations and an agent platform using the same.

DETAILED DESCRIPTION OF THE INVENTION

Hereinafter, embodiments of the present invention will be described in more detail with reference to the accompanying drawings.

A prediction-based dynamic thread pool management method according to the present invention proposes a method of quickly supplying optimal services and efficiently using resources. The prediction-based dynamic thread pool management method can improve the response time of an agent platform efficiently in case that the number of agent's requests is large by dynamically managing the number of threads according to an agent's request amount.

That is, the prediction-based dynamic thread pool management method according to the present invention considers the following matters so as to efficiently utilize the system resource:

Creation of the threads: previously create a thread by grasping an increment level when the number of requests received from the agent increases.

Deletion of the threads: avoid a sharp decrement in the number of threads when the number of requests received from the agent decreases. The reason why avoiding the sharp decrease in number of threads is that, after the number of threads decreases rapidly according to the decrement in the number of requests, unnecessary deletion and creation processes are repeated when the number of threads increases again. In order to prevent these problems, the thread is not deleted immediately, but the thread is maintained for a predetermined time.

Increase/decrease rate of the threads: prevent a decrement of the response time or inefficient utilization of the system resource caused by the creation of the unnecessary threads by decreasing the number of controls when the increase/decrease rate of the thread is low and increasing the number of controls when the increase/decrease rate of the thread is high.

The prediction-based dynamic thread pool management method according to the present invention will be described in more detail with reference to FIGS. 1 and 2.

Figure 1:
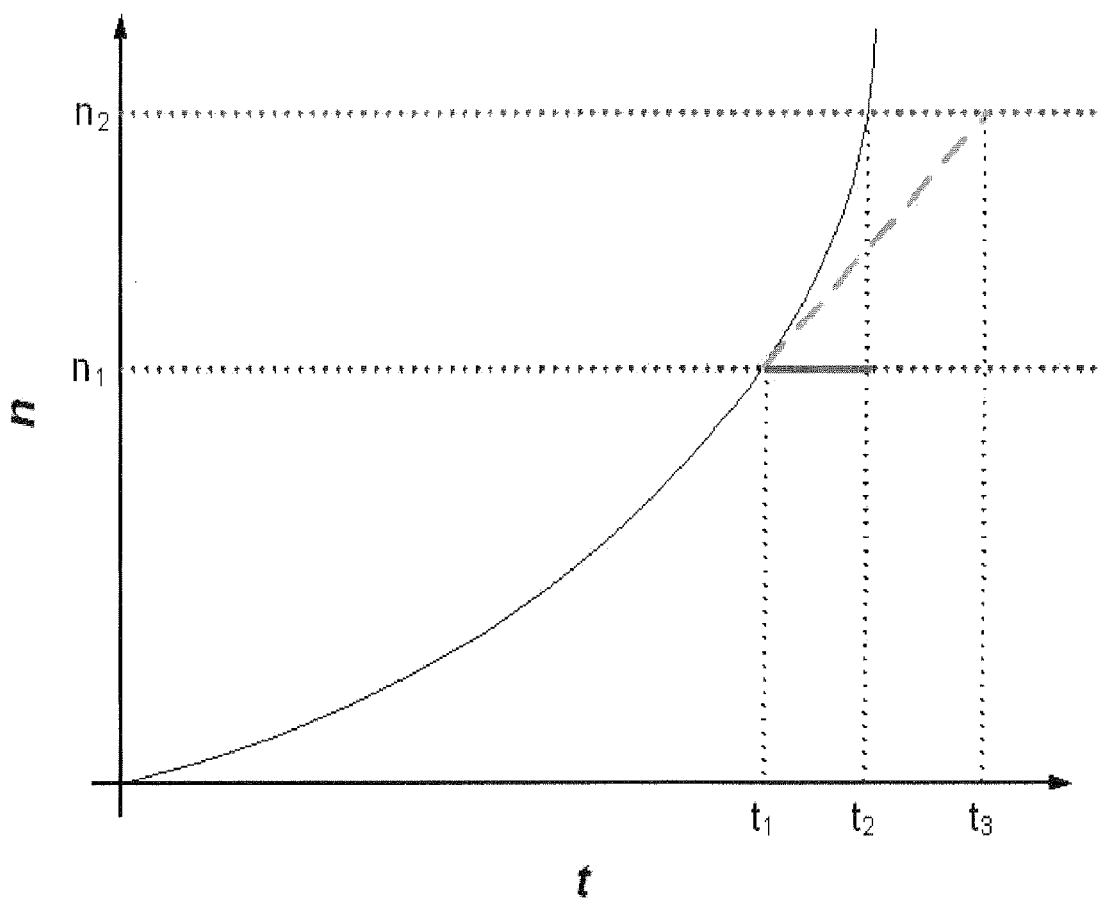
FIG. 1 is a graph illustrating the number n of threads versus the time t.

FIG. 1 is a graph illustrating the number of threads n for a time t. Herein, $n_t$ represents the number of threads at the time t and is defined as shown in Equation 1.

$$n_t = \{x | x \text{ is the number of thread in the system when time } t\} \quad \text{Equation 1}$$

The variation of the number of the threads at the time t, that is, the thread variation at is defined and obtained from the following Equation 2.

$$a^t = \{x | x \text{ is the variant when time } t\} \quad \text{Equation 2}$$
$$= \frac{n_t - n_{t-\Delta t}}{t - \Delta t}$$

For example, in FIG. 1, a number of expected threads at a time t2 which can be predicted at the time t1 are obtained from Equation 3.

$$f_{expected}(t_2, t_1) = \{x | x \text{ is the expected } n_{t_2} \text{ when time } t_1\} \quad \text{Equation 3}$$
$$= a_{t_1} \cdot t_2$$

Herein, $f$ expected $(t_2, t_1)$ is a function for defining and calculating the number of threads.

Meanwhile, when a time delay to which the number of the expected threads is applied is represented by $\Delta t_d$ (a value being in inverse proportion to the number of repeated processes of predicting the expected threads per unit time), a time taken to create one thread is represented by $\Delta t_m$, an observation error function is represented by $f_{error}$, and a used resource is represented by $Resource_k$, they are defined as follows.

$$\Delta t_d = \{x | x \text{ is the time delay} \quad \text{Equation 4}$$
$$\text{between the time of applying variabe } a^t\}$$

$$\Delta t_m = \{x | x \text{ is the time delay to make one thread}\} \quad \text{Equation 5}$$
$$k \subset Z, \forall \Delta t_d \; \Delta t_d = k \cdot \Delta t_m$$
$$f_{error}(t) = \{x | x \text{ is expected value of error when time } t\}$$
$$= |f_{expected}(t, \Delta t_d) - n_t|$$

$$resource_k = \{x | x \text{ is exhausted resource} \quad \text{Equation 6}$$
$$\text{in system } k \text{ for thread pool scheduling}\}$$

By considering the number of the expected threads obtained from the above-mentioned method, as an application range is changed from t1 to t2 and t3, $f_{error}$ increases as shown in FIG. 1. As the time delay $\Delta t_d$ decreases, a required amount of consumed resource increases. That is, the time delay $\Delta t_d$ is in proportion to and is in inverse proportion to $Resource_k$.

Therefore, the prediction-based dynamic thread pool management method according to the present invention uses a time delay variable algorithm where the time delay $\Delta t_d$ increases in case that a change of the thread variation is small and the time delay $\Delta t_d$ decreases in case that the change of the thread variation is large by grasping the change of the thread variation. That is, a repetition number per hour (hereinafter, referred to as 'executing frequency') of a process for calculating the number of the expected threads, that is, a step of calculating the thread variation to the variation of the number of threads at a time t1 and a step of calculating the number of the expected threads at a time t2 on the basis of the variation of the thread decrease in case that the change of the thread variation is small and the executing frequency increase in case that the change of the thread variation is large.

Hereinafter, the principle of the time delay variable algorithm in the prediction-based dynamic thread pool management method according to the present invention will be described in detail.

First, a sampling constant for defining the number of the thread variations sampled per hour is set. Herein, in the prediction-based dynamic thread pool management method according to the present invention, setting the sampling constant to 40 is explained as one example.

In this example, the average and variance of 40 thread variations per hour, $a_t$ are used. The sampling constant of 40 is determined to be one of experimental values sensitive to a change of the thread variations, $a_t$ through repeated experiments.

The thread variations sampled as large as the sampling constant per hour, and the average and variance (or standard deviation) calculated by using the thread variations are applied to the Gaussian probability density function. The pdf Equation of Gaussian variables for the thread variations is shown in Equation 7.

$$f(x) = \frac{e^{-(x-m)^2/2\sigma^2}}{\sqrt{2\pi\sigma^2}} \quad \text{Equation 7}$$

In Equation 7, x represents the thread variations, $a_t$, m represents the average of the thread variations and $\sigma^2$ represents the variance of the thread variations. Herein, when it is supposed that the average m and variance $\sigma$ of the threads variations have values of 5 and 5, respectively, the values for the average and the variance are plotted in the graph shown in FIG. 2.

Figure 2:
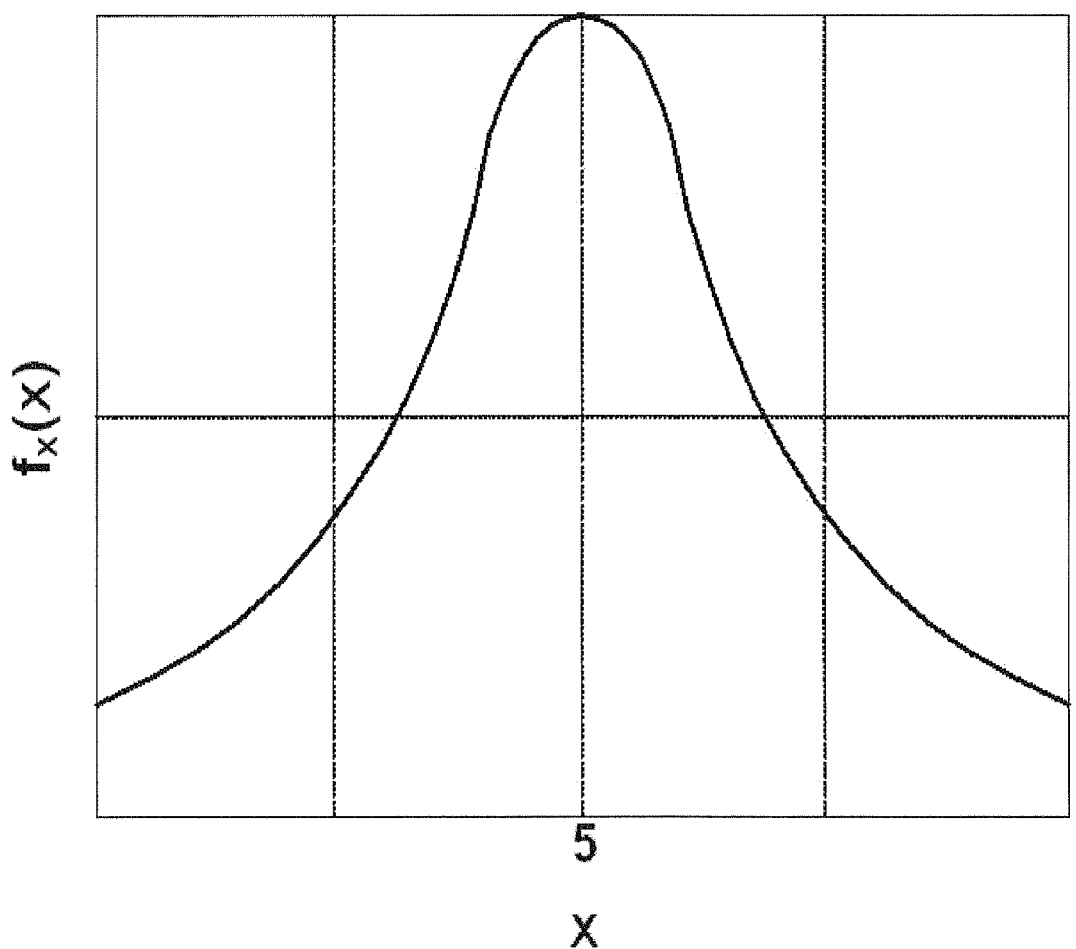
FIG. 2 is a Gaussian probability density graph illustrating an average and variance of thread variations according to the present invention.

At this time, a delay decreases by a predetermined reference unit in case that the change of the thread variation is out of a predetermined reference range from the center calculated through a Q-Function, for example, 70% in FIG. 2 (above 7 or below 3 in FIG. 3) and the delay increases by the reference unit in case that the change of the thread variation is within the reference range.

This is represented by Equation 8.

$$\begin{cases} \text{if } \forall a_t, 2Q\left[\frac{a_t - m}{\sigma}\right] \geq R \text{ then } \Delta t_d = \Delta t_d - \Delta t_m \\ \text{if } \forall a_t, 2Q\left[\frac{a_t - m}{\sigma}\right] < R \text{ then } \Delta t_d = \Delta t_d + \Delta t_m \end{cases} \quad \text{Equation 8}$$

Herein, $a_t$ represents the thread variation, Q(x) represents is the Q-Function, R represents the reference range, and $\Delta t_m$ and $\Delta t_d$ are the same as those described above.

By the above-mentioned configuration, in the prediction-based dynamic thread pool management method, a delay of a response time is prevented by predicting the number of threads more actually by creating the thread by predicting the number of required threads and applying time delay variable algorithm as described above at the time of creating the thread, and unnecessary waste of resources is preventing by increasing the efficiency of resource usage, thereby quickly coping with the problems.

Hereinafter, an agent platform 1 to which the prediction-based dynamic thread pool management method according to the present invention will be described in more detail with reference to FIGS. 3 and 4.

The agent platform 1 according to the present invention creates a thread pool 13 at the time of initial driving. At this time, the size of the thread pool 13 is dynamically controlled by an agent's request. That is, when the agent platform 1 receives one request, the agent platform 1 allocates one thread in the thread pool 13. Unless a worker thread does not exist, the agent platform 1 creates a new thread.

Figure 3:
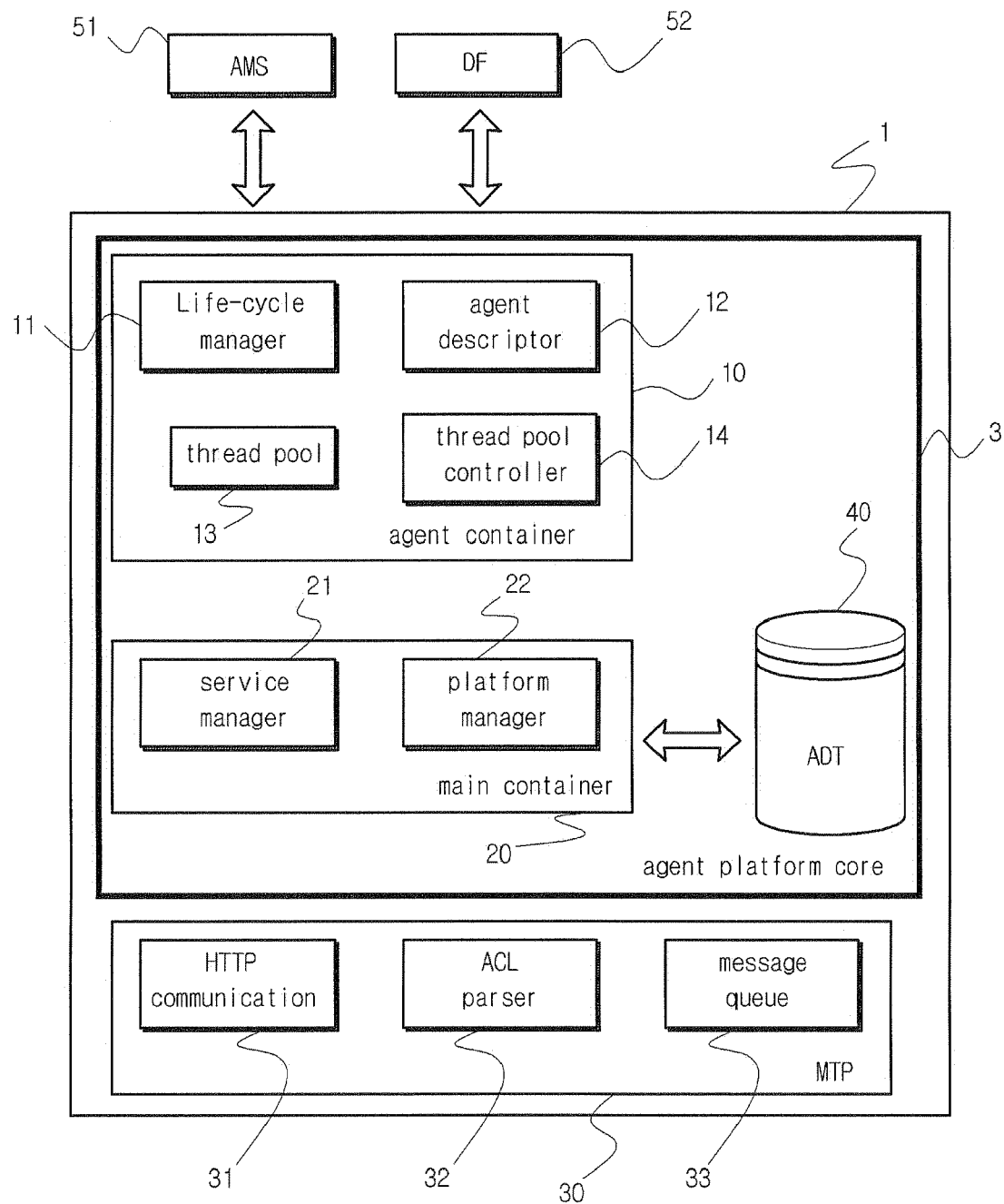
FIG. 3 is a diagram illustrating a configuration of an agent platform to which a prediction-based dynamic thread pool management method according to the present invention.
Figure 4:
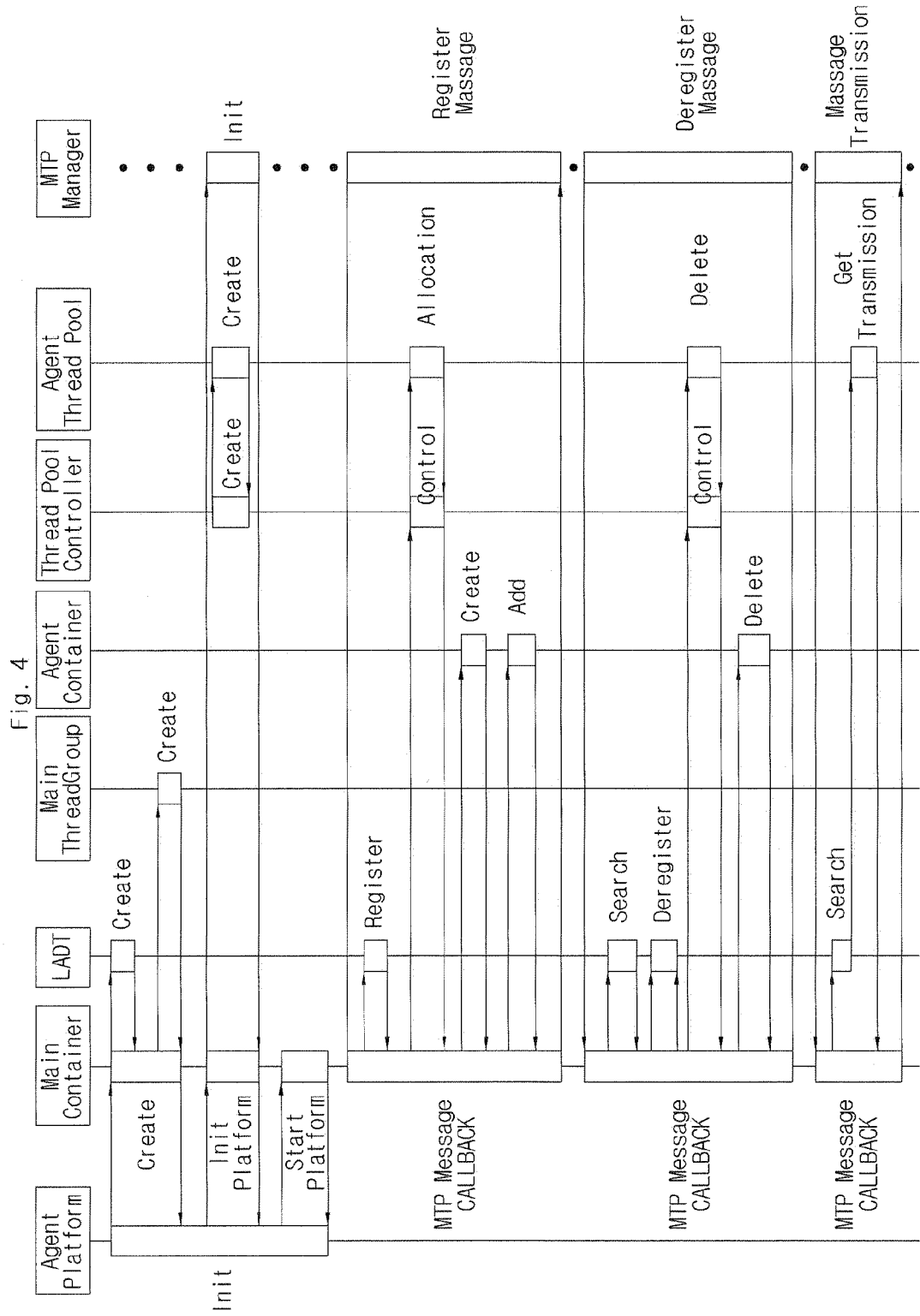
FIG. 4 is a diagram illustrating the operation condition of an agent platform core of the agent platform of FIG. 3.

As shown in FIG. 3, a thread pool controller 14 is disposed within an agent container 10 of the agent platform 1. The thread pool controller 14 calculates the number of the expected threads by the use of the above-mentioned $f_{expected}$ (t2,t1) and regulates the size of the thread pool 13 on the basis of the calculated number of the expected threads.

The agent platform 1 includes a message transport Protocol (MTP) 30 for transmitting and receiving messages to and from the agent with credibility on the basis of HTTP by the use of the ACL (Agent Communication Language) of an FIPA (Foundation for Intelligent Physical Agents) The agent platform 1 further includes an agent platform core 3 that manages the agent and the agent platform 1.

Specifically to describe the components, the message transport protocol 30 may include an HTTP communication 31, an ACL parser 32 and a message queue 33.

The HTTP communication 31, which is a module for communicating the agents on the basis of an HTTP, incorporates both a client module and a server module. The HTTP server module processes the message at the time of receiving the message and the HTTP client module processes the message at the time of transmitting the message.

The ACL parser 32 encodes and decodes ACL messages transmitted to and received from the agents. The message queue 33 performs ordering and queuing of the message at the time of receiving and transmitting the messages from and to several agents.

Meanwhile, the agent platform core 3 may include a main container 20, an agent container 10 and an ADT (Agent Description Table) 40.

The main container 20, which is a module for executing and managing the agent platform 1, may include a platform manager 22 and a service manager 21.

The platform manager 22 initializes the platform and transmits the messages received from the message transport protocol 30 to agent processing modules. The service manger 21 manages registration of additional services added to the agent platform 1 and the services.

The agent container 10 carries out the hierarchical grouping of agents having the same role and function by using a container. Herein, the agent container 10 may include a life-cycle manger 11, an agent descriptor 12, a thread pool 13 and a thread pool controller 14.

The life-cycle manager 11, which is a thread for monitoring and managing conditions and operations of the agents, carries out start, suspend, resume and stop functions. The agent descriptor 12 manages agent specification information including IDs, addresses, and roles of the agents.

Herein, the thread pool 13 and the thread pool controller 14 manage the thread pool 13 by using the above-mentioned prediction-based dynamic thread pool management method according to the present invention. Accordingly, description thereof will be omitted.

The agent description table 40 is a Hash table for managing a reference value for agent information by using the IDs of the agents as key values.

Undescribed reference numeral 51 of FIG. 3 represents an AMS (Agent Management System) and is an agent for totally controlling the access to and the usage of the agent platform 1. The agent management system 51 provides a white page service and manages life cycles of the agents.

Undescribed reference numeral 52 of FIG. 3 represents a DF (Directory Facilitator) and searches an agent for a specific service existing on a network as an agent provided to a yellow page service from the agent platform 1.

Hereinafter, a configuration and an operation of the agent platform 1 according to the present invention will be described in more detail.

The agent platform core 3 calls and uses an MTP library. The agent platform core 3 is hierarchically constituted of one main container 20 and a plurality of agent containers 10. The agent container 10 manages a plurality of agent information in a group.

The agent container 10 constitutes the agent information by specification information for connection and management of the agents, and condition information for the life cycles. The agent thread carries out start, stop, resume and run functions similarly as the current agent condition.

The agent platform core 3 plays roles in general management of the agent platform 1 and connection of interactions between the agents. The agent platform core 3 manages a relationship between the service and a module through the stream of main operations.

By this configuration, when the agent platform 1 starts, the agent container 10 is created. The main container 20 reads a configuration file of XML format for initialization. The configuration file is constituted of version information, name, address, port and resource information of the agent platform 1.

After then, the ADT 40 for direct access to the agent specification information is created. A main thread group table (not shown) of the ADT 40 which manages reference values of the agent container 14, the thread pool controller 14 and the thread pool 13 are created.

The HTTP server module of the HTTP communication 31 of the message transport protocol 30 is initialized and completes preparation for receiving the ACL messages by callback. FIG. 4 illustrates a flow of major operations of the agent platform core 3 and is a diagram for describing a correlation between the module and service for the management of the agents.

Meanwhile, the ACL messages are transmitted so as to register the agents in the agent platform 1. At this time, the agent platform core 3 checks whether or not the ACL message is a message transmitted to the agent platform 1 through receiver items of the ACL after receiving the call-back of the messages from the message transport protocol 30. After the agent platform core 3 checks whether the transmitted message is a registered message through content items of the ACL and obtains the name, address, port, detailed information and corresponding container information of the agent.

Next, the agent platform core 3 checks whether or not the message has been already registered in the agent description table 40 by using the ID of the agent as a Hash key and then, it registers the ID of the agent when the message is not registered in the agent description table 40.

At this time, the agent platform core 3 transmits a failure message including a message 'already-registered' to the agent when the ID of the agent has been already registered After the ID of the agent has been registered in the agent description table 40, one agent thread in the tread pool 13 is allocated. The allocated agent thread has the detailed agent information and performs dynamic monitoring depending on the condition of the agent.

After checking whether the corresponding agent container 10 has been already created, a new agent container is created when the corresponding container 10 does not exist and the corresponding agent container is added to the existing agent container 10 when the corresponding agent container 10 exists. As described above, when the registration is completed, the registered processing result is transmitted to the agent.

Meanwhile, in case that a receiver of the ACL message received through the message call-back is not the agent platform 1, the agent platform core 3 transmits a message indicating that the receiver is not the agent platform 1 to the corresponding agent. At this time, the agent which transmits the message does not have both physical address information and port information of an agent which receives the message. It requests the agent platform 1 to transmit the message with the only ID of the agent which receives the message.

Accordingly, the agent platform 1 obtains required information from the agent thread module with the agent specification information after searching the agent description table 40 for finding address information corresponding to the name of the agent which receives the message and changes attribute values such as the name and address of the agent which receives the message. The agent platform 1 transmits the changed attribute information to the corresponding agent. The agent platform core 3 processes the message in parallel with being supported from the message transport protocol 30. The agent platform core 3 monitors the agent by the use of the thread to collect management information.

Figure 5:
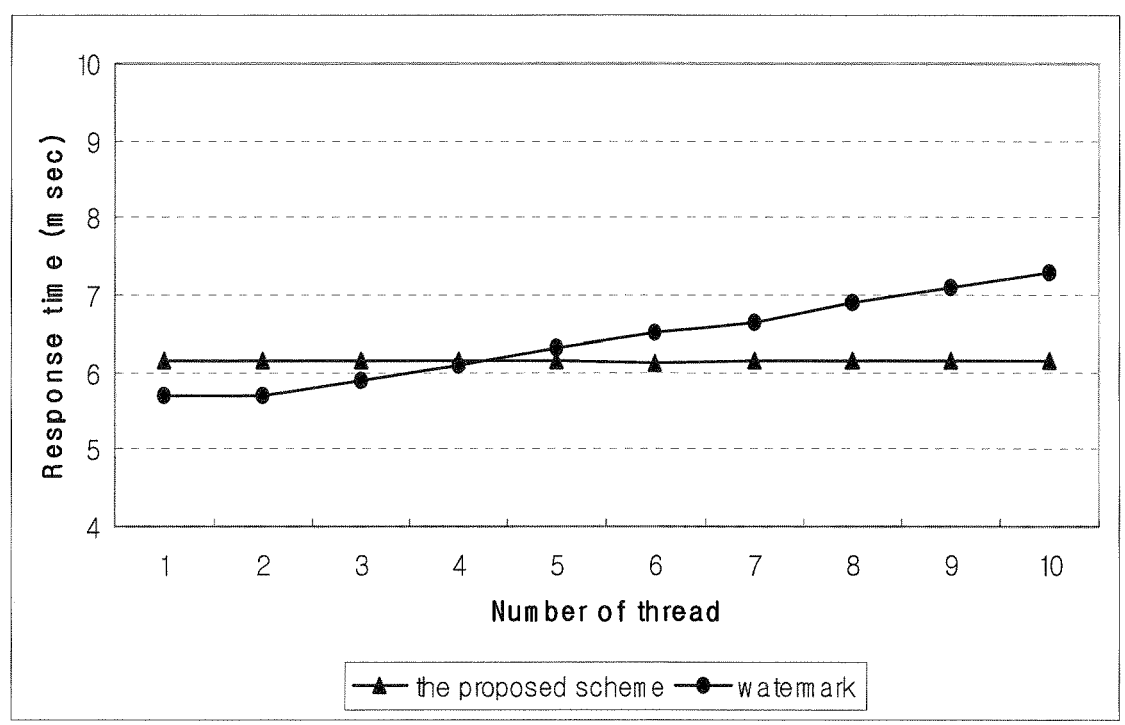
FIG. 5 is a graph illustrating a comparative analysis of a response time performance in overload between a conventional watermark thread pool model and the prediction-based dynamic thread pool management method according to the present invention.
Figure 6:
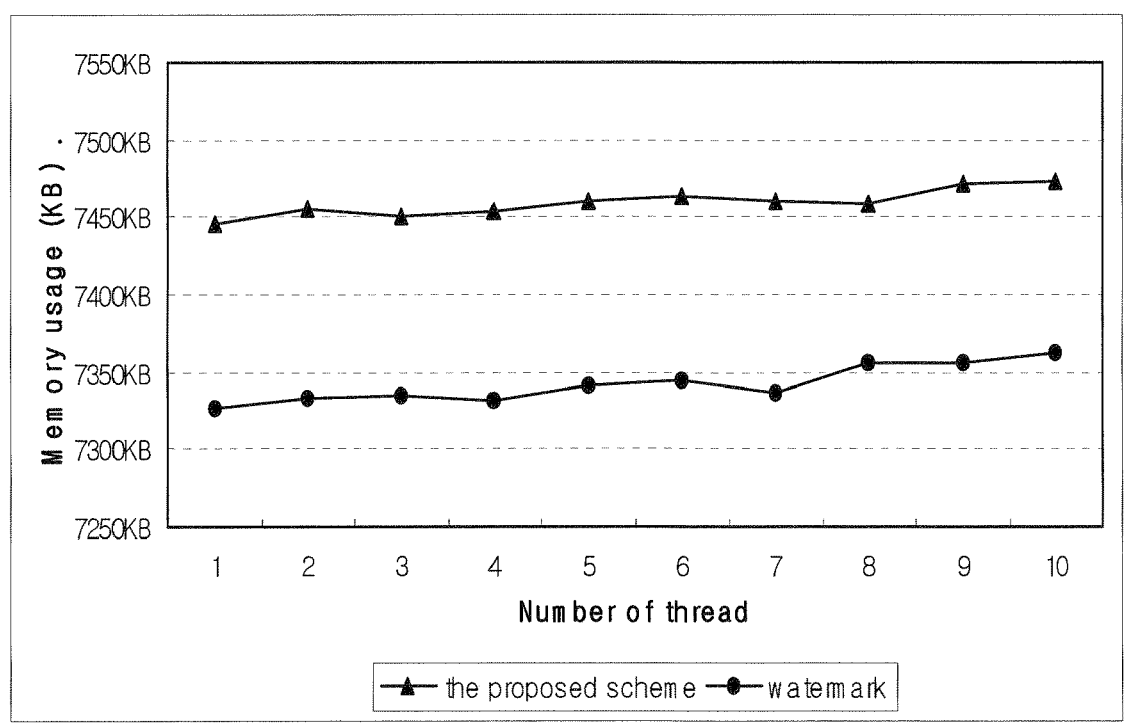
FIG. 6 is a graph illustrating a comparative analysis of memory usage in the overload between the conventional watermark thread pool model and the prediction-based dynamic thread pool management method according to the present invention.

Meanwhile, FIGS. 5 and 6 are graphs illustrating a response time and memory usage in overload. As shown in FIGS. 5 and 6, when the number of threads is not less than 4, the prediction-based dynamic thread pool management method according to the present invention is superior to a known watermark thread pool model in the response time, while the prediction-based dynamic thread pool management method according to the present invention needs more memory usage of less than 0.5% than the known watermark thread pool model.

Under experimental conditions shown in FIGS. 5 and 6, the size of the thread pool is predicted by transmitting the agent request message every 0.1 second and setting an idle timeout to 0.3 seconds before deleting the thread. As the agent's request amount increases, the number of threads to be scheduled also increases. Therefore, the response time itself increases. In this case, it is preferable to decrease the response time despite using more system resources. It is found that the prediction-based dynamic thread pool management method according to the present invention is preferable to the watermark thread pool model.

Figure 7:
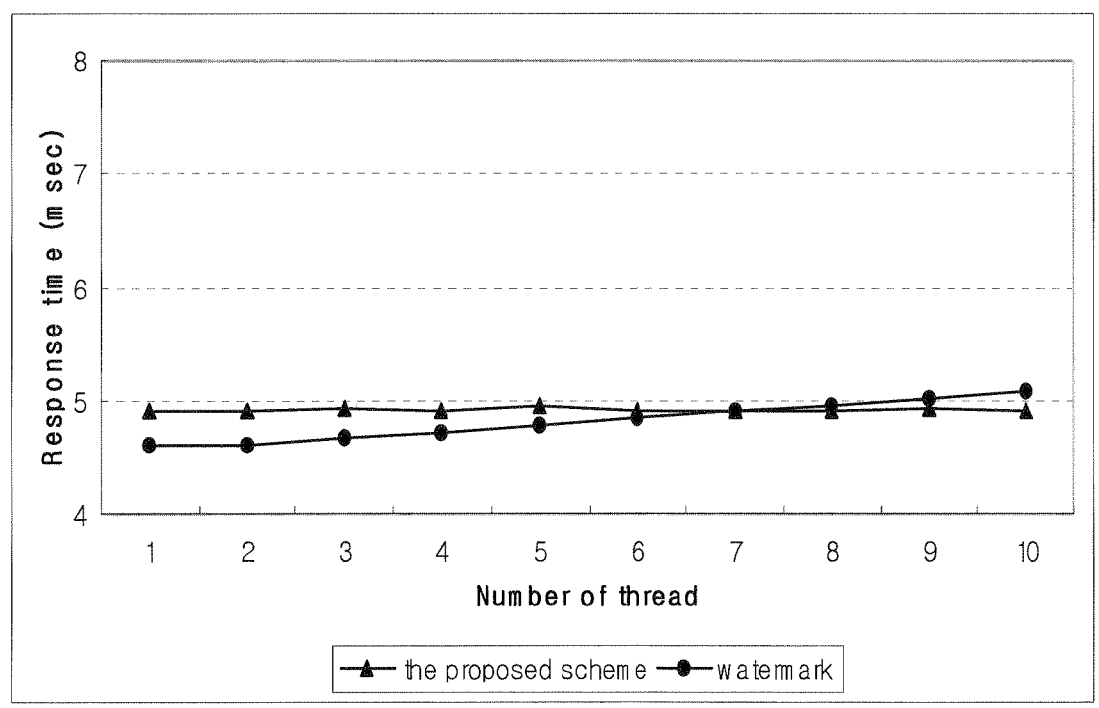
FIG. 7 is a graph illustrating a comparative analysis of a response time performance in low load between the conventional watermark thread pool model and the prediction-based dynamic thread pool management method according to the present invention.
Figure 8:
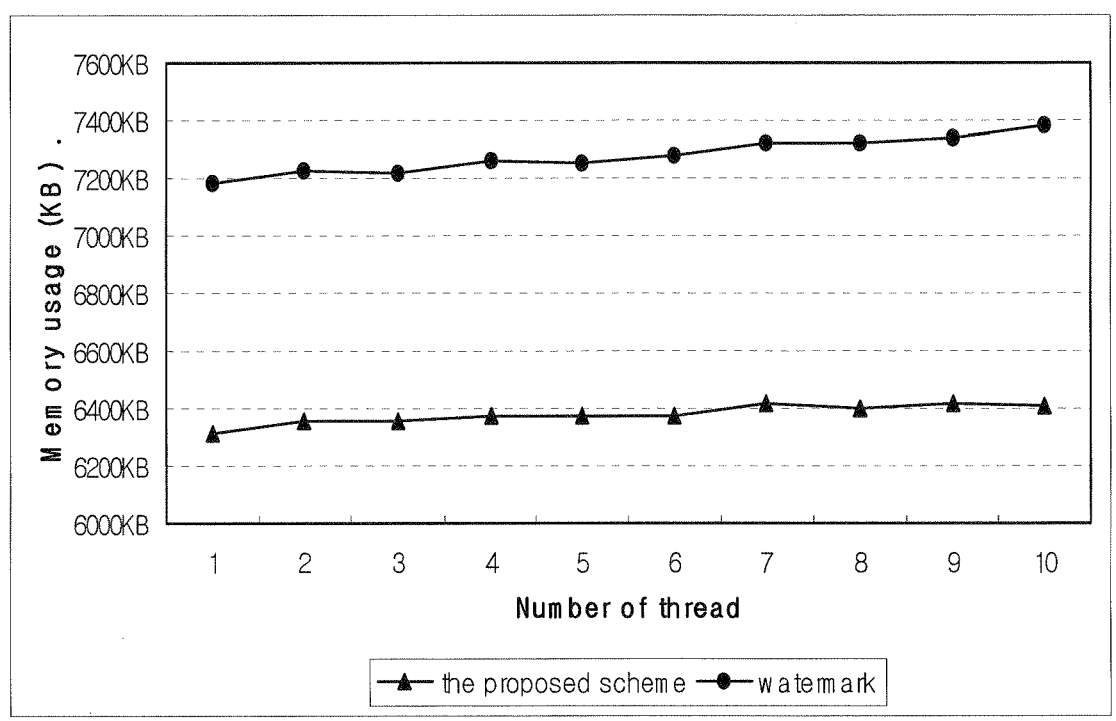
FIG. 8 is a graph illustrating a comparative analysis of memory usage in the low load between the conventional watermark thread pool model and the prediction-based dynamic thread pool management method according to the present invention.

FIGS. 7 and 8 are diagrams illustrating the response time and memory usage in low load. Under experimental conditions shown in FIGS. 7 and 8, the agent request message is transmitted every 5 seconds. In this case, the watermark thread pool model has a low watermark value, and thus it operates similarly as a worker thread pool model. As shown in FIG. 7, the response time in the low load is similar to that in the overload. However, the prediction-based dynamic thread pool needs memory still less than the watermark thread pool in the memory usage view.

While preferred embodiments of the present invention have been described in detail, the scope of the invention is not limited to it, but various additional variations and modifications in those embodiments which occur to those skilled in the art once they learn of the basic inventive concepts defined in the appended claims belong to the scope of the invention.

What is claimed is:

1. A method for managing a thread pool in a computing system using threads in the thread pool to execute tasks comprising:
   (a) calculating a thread variation based on a number of threads;
   (b) calculating an expected number of threads to be required for a future time based on the calculated thread variation, so as to regulate threads in the thread pool according to the expected number;
   (c) determining a change from the previous thread variation and the present thread variation; and
   (d) decreasing an executing frequency of said steps (a) and (b) if the change of the thread variations at said step (c) is determined as small and otherwise increasing the executing frequency of said steps (a) and (b),
   wherein said step (c) includes:
   (c1) setting a sampling constant defining a number of the thread variations to be sampled per hour;
   (c2) sampling the thread variations as many times per hour as the sampling constant;
   (c3) calculating an average and a variance of the sampled thread variations;
   (c4) applying the sampled value, the average and the variance of the sampled thread variations to a Gaussian probability density function; and
   (c5) determining the change of the thread variations as small if the change of the thread variations is out of a predetermined reference range from a center of a result of the application of the Gaussian probability density function and as not small otherwise,
   wherein the Gaussian probability density function is represented by $$f(x) = \frac{e^{-(x-m)^2/2\sigma^2}}{\sqrt{2\pi\sigma^2}}$$

where, x represents the thread variation, m represents the average of the thread variations, and σ2 represents the variance of the thread variations, and
   wherein said step (d) includes:
   (d1) increasing the executing frequency of said steps (a) and (b) by a predetermined reference amount in case that it is determined that the change of the thread variations is out of the reference range from the center of the result of the application of the Gaussian probability density function in said step (c5); and
   (d2) decreasing the executing frequency of said steps (a) and (b) by the predetermined reference amount in case that it is determined that the change of the thread variations is within the reference range from the center of the result of the application of the Gaussian probability density function in said step (c5).

2. The method according to claim 1, wherein the center of the application result of the Gaussian probability density function is determined by a Q-Function.

3. The method according to claim 2, wherein said steps (d1) and (d2) are represented by $$\begin{cases} \text{if } \forall a_t, 2Q\left[\frac{a_t - m}{\sigma}\right] \geq R \text{ then } \Delta t_d = \Delta t_d - \Delta t_m \\ \text{if } \forall a_t, 2Q\left[\frac{a_t - m}{\sigma}\right] < R \text{ then } \Delta t_d = \Delta t_d + \Delta t_m \end{cases}$$

where, $a_t$ represents the thread variation, Q(x) represents the Q-Function, R represents the reference range, $\Delta t_m$ represents a time taken to create one thread, and $\Delta t_d$ represents as a value corresponding to one cycle in the executing frequency of said steps (a) and (b) and is integral multiple of $\Delta t_m$.

4. An agent platform based on a computing system using threads in a thread pool to execute tasks with respect to agents, comprising:
   a message transport protocol for transmitting and receiving messages to and from the agents on the basis of HTTP by using an agent communication language to enable cooperation between the agents existing in heterogeneous systems; and
   an agent platform core for managing the agents by transmitting and receiving the messages to and from the agents via the message transport protocol, so as to manage the agents,
   wherein the agent platform core includes:
   a thread pool controller for managing the thread pool by dynamically regulating a number of the threads in the thread pool and by adjusting frequency of calculating an expected number of threads according to claim 1.

5. The agent platform according to claim 4, wherein the agent communication language includes an ACL (Agent Communication Language).

6. The agent platform according to claim 5, wherein the agent platform core includes:
   a main container being in charge of execution and management of a platform;
   an agent container managing the agents by hierarchically grouping the agents with a container; and
   an agent description table managing a reference value for information on the agents by using IDs of the agents as key values.

7. The agent platform according to claim 6, wherein the agent container includes:
   a life-cycle manager monitoring the conditions and operations of the agents;
   an agent descriptor managing agent specification information including the IDs, addresses and functions of the agents; and
   a thread pool controller managing the thread pool through the prediction-based dynamic thread pool management method.

8. The agent platform according to claim 7, wherein the message transport protocol includes:
   an HTTP communication including an HTTP server module processing messages received from the agents on the basis of HTTP and an HTTP client module processing the messages transmitted to the agents on the basis of the HTTP;
   an ACL parser encoding and decoding an ACL message for transmitting and receiving data to and from the agents; and
   a message queue performing ordering and queuing of the messages transmitted to and received from the agents through the HTTP communication.

* * * * *